Figure 1:
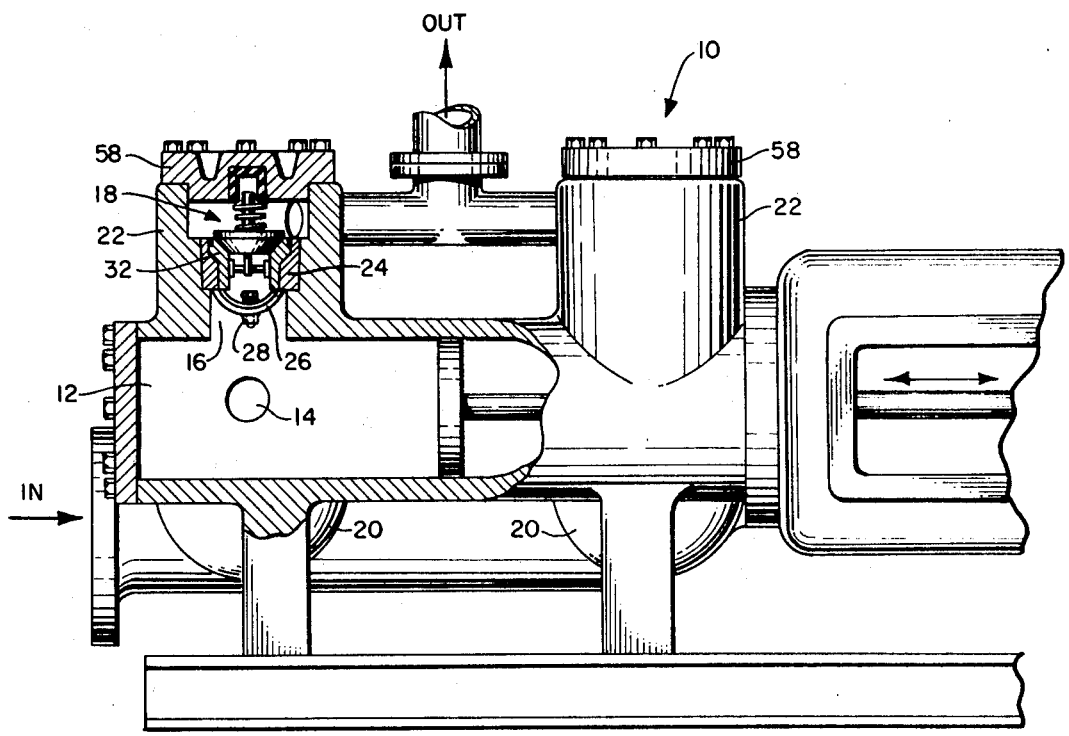

United States Patent

[11] 3,590,837

[72] Inventor Leo Jeanise
 131 Pat LeBlanc St., Schriever, La. 70395
[21] Appl. No. 862,228
[22] Filed Sept. 30, 1969
[45] Patented July 6, 1971

[54] COMBINATION OF VALVE SEAT BASE AND REPLACEABLE VALVE SEATS, AND METHOD OF SECURING TOGETHER AND IN PLACE
 5 Claims, 5 Drawing Figs.
[52] U.S. Cl.................................................... 137/15,
 137/329.01, 137/515.5, 137/540, 251/363
[51] Int. Cl....................................................... F16k 15/00
[50] Field of Search........................................... 137/15,
 315, 329, 329.01, 329.02, 329.03, 329.04, 515.5,
 540; 251/333, 359, 360, 363

[56] References Cited
UNITED STATES PATENTS
2,143,399  1/1939  Abercrombie ............... 137/540
2,566,502  9/1951  Smith ........................... 137/15
2,983,281  5/1961  Bynum ......................... 251/363 X
3,167,855  2/1965  Moen ........................... 137/15 X Primary Examiner—William F. O'Dea
Assistant Examiner—David R. Matthews
Attorney—James B. Lake, Jr.

ABSTRACT: The combination of a hollow valve seat base for force fitting into a valve casing of a pump, said base having a transverse bottom structure defining a center-threaded hole, a hollow valve seat having a transverse bottom structure defining a center hole and adapted to fit into said base with center holes conforming, a bolt threaded to engage the threads of the center-threaded hole of the base through the center hole of the valve seat, and a coil spring mounted on said bolt, the spring and bolt for fastening the base and the valve seat together under constant pressure of the spring compressed between the bolthead and the valve seat bottom structure, thereby preventing the loosening of the fastening.

INVENTOR.
LEO JEANISE
BY *James B. Lake, Jr.*
ATTORNEY

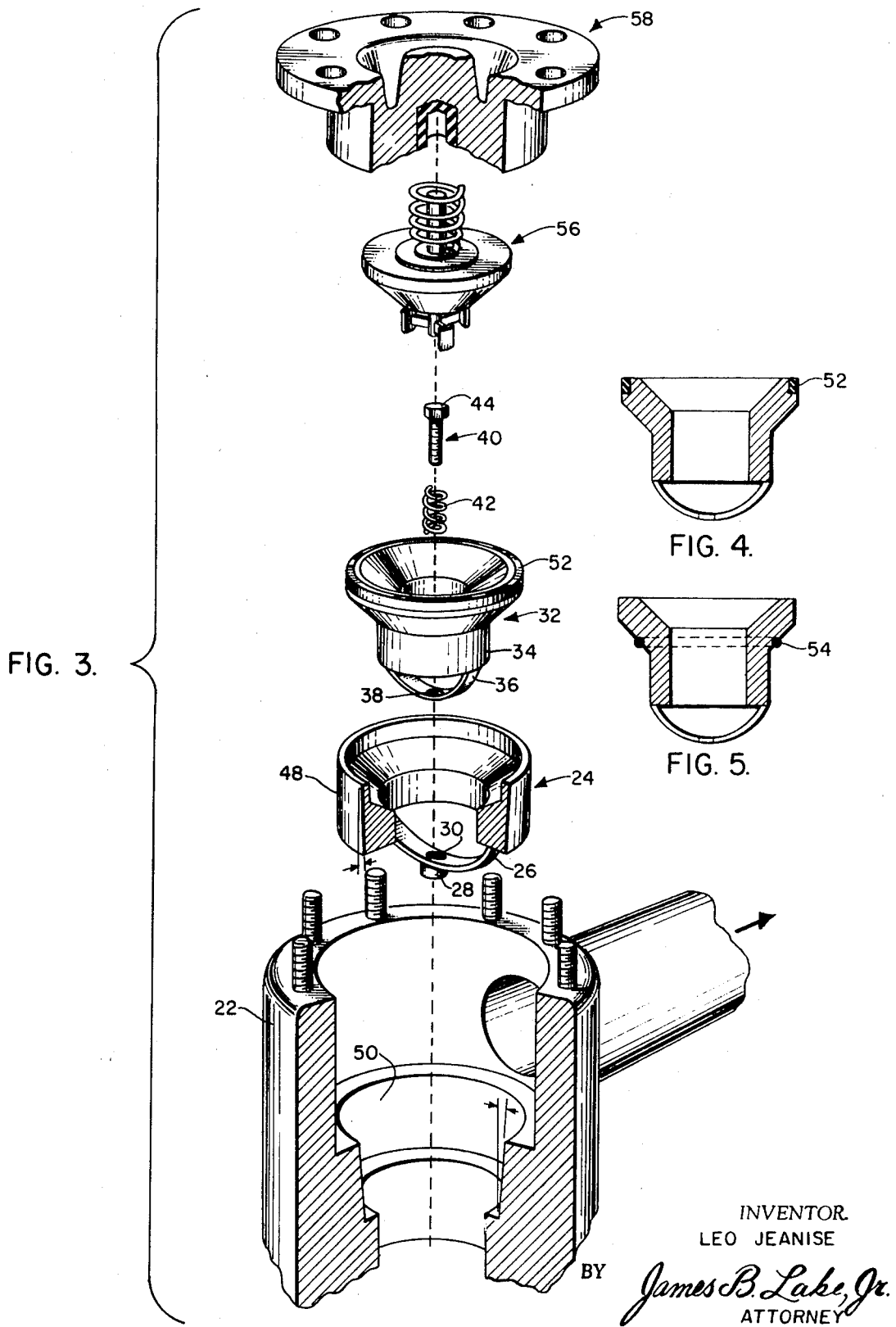

COMBINATION OF VALVE SEAT BASE AND REPLACEABLE VALVE SEATS, AND METHOD OF SECURING TOGETHER AND IN PLACE

The invention relates generally to valve seats and more particularly to replaceable valve seats in the cooperating structure in pumps, and the method of securing the valve seat and cooperating structure together and in place.

Heretofore replaceable valve seats have been approximately cylindrical in shape and secured in place with side screws or bolts. This type of fastening has not proven satisfactory when used in large pumps working with material of high viscosity and at high rates of speed of about 60 strokes per minute such as a mud pump used in oil well drilling operations. The replaceable valve seats tend to work loose and hammer destructively in place. The valve seat of this type could only be replaced by dismantling the pump in order to get to the holding screws.

An object of the invention is to provide a valve seat that is replaceable and does not come loose in operation of the pump and will thus last several times as long as present seats.

Another object of the invention is to provide a replaceable valve seat that can be replaced easily and economically without disassembling the pump.

Figure 2:
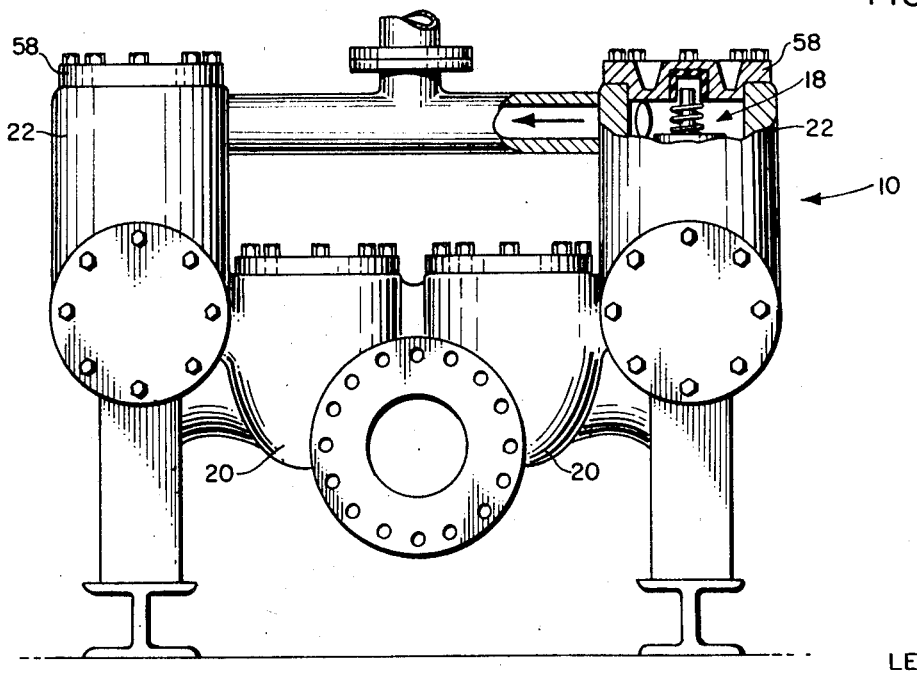

Other objects and a fuller understanding of the invention may be had by referring to the following description and claims and the drawings in which:

FIG. 1 is a side view partially cut away of a mud pump showing the invention operatively installed in a discharge side of the pump, FIG. 2 is a front view of a mud pump partially cut away to show a valve top and discharge therefrom, FIG. 3 is an exploded perspective view of the invention relative to its installation in the pump, FIG. 4 is a view along section line 4—4 of FIG. 3, and FIG. 5 is similar to FIG. 4 showing a second specie of seal.

Referring to FIGS. 1 and 2, a mud pump 10 is partially shown and cut away to show the pumping cylinder 12, an intake port 14 into the cylinder 12 and the discharge port 16 from the cylinder up to discharge valve 18. There are four intake valve casings 20 and four discharge casings 22, all housing identical valves 18, only one of which will be described. The invention comprises the valve seat base 24 having a transverse bottom structure 26 which is thickened in the center or has a nut 28 welded thereto and defines a hole 30 therethrough (see figure 3). A replaceable valve seat 32 having a bottom structure 34 with a transverse element 36 defining a center hole 38 is complementarily shaped to fit within the base 24 with the center holes 30 and 38 congruent. Referring to figure 3, the bolt 40 mounts the spring 42 on its threaded portion and engages through the holes 30 and 38 the complementary threads of nut 28. The bolt is tightened by rotation and compresses the spring 42 between the bolthead 44 and the transverse element 36 as it bolts together the seat base and the valve seat 32 and prevents counter rotation.

To use the invention the seat base 24 is driven into the valve casing 20. The walls 48 of the base 24 are tapered exteriorly to drive fit the tapered walls 50 of the valve casing 20. When the base is driven into the valve casing it is firmly held in place in the casing and can only be removed with special tools not shown. The valve seat 32 is dropped into the base 24 and secured thereto by the bolt and spring as described hereinbefore. The valve seat has an external sealing ring 52 inset into its upper outer periphery for sealing the sides of the valve seat in the base in order that all the discharge passes through the valve seat and not around it. Referring to FIG. 5 an O-ring 54 may alternatively be placed as shown for the same purpose. The valve 56 is dropped into the valve seat 34 and the casing top 58 is bolted in place to hold the valve in operative relation with the valve seat.

If the operation of the valve becomes unsatisfactory, it is only necessary to remove the casing top 58 and lift out the valve 56 which can be replaced if need be. The valve seat can be removed by merely counterrotating the bolt 40 and lifting it out against only the sealing ring friction as shown in FIG. 4 or the O-ring friction as shown in FIG. 5. A new valve seat can be bolted in place in the base and the pump returned to operation in a few minutes.

The invention thus prevents the vibration of the heavy pumps pumping materials of high viscosity from counterrotating the fastening bolt to allow the valve seat to hammer in its base and at the same time provides a fastening that can be reached from inside the valve seat.

What I claim is:

1. In combination with a high-capacity pump, having a valve casing, for pumping high-viscosity material, a valve seat base having a transverse bottom structure defining a center axis, threaded hole and adapted to be drive fitted into said valve casing, a removable valve seat having a bottom structure concentric with and adapted to fit into said seat base, said valve seat having a transverse lower element defining a center axis hole congruent with said threaded hole of the valve seat base, a seal fitted between said valve seat base and said valve seat for preventing leakage of the pumped material, a center bolt having a bolthead and a threaded body complementary to the threaded hole of said valve seat base and engageable therein, and a coil spring adapted to fit around said center bolt threaded body, said center bolt with the coil spring fitted therearound for engaging through said hole defined by the transverse lower element of the valve seat into said threaded hole defined by said transverse bottom structure of the valve seat base thereby compressing said coil spring between the center bolthead and the transverse lower element of said valve seat to prevent counter rotation of the center bolt and securely fasten the removable valve seat to the valve seat base.

2. A combination as described in claim 1 wherein said driven fit comprises a valve casing interiorly tapered outwardly and upwardly and said valve seat base tapered exteriorly complementary to but slightly more than said valve casing interior taper.

3. A combination as described in claim 1 wherein said seal comprises a flexible material recessed into but extending slightly therebeyond the upper outer edge of said valve seat.

4. A combination as described in claim 1 wherein said seal comprises an "0" ring partially recessed into the exterior of said valve seat above said bottom structure.

5. The method of changing valve seats in a high-capacity pump having a valve casing, comprising the steps of: removing the top of the valve casing; lifting out the valve and valve spring; counter rotating a center bolt, prevented from counter rotation by vibration by a coil spring mounted thereon and compressed between bolthead and a transverse element of the valve seat, disengaging said center bolt from threaded engagement with a transverse structure of the valve seat base and releasing the compression of said coil spring; lifting out old valve seat and replacing with a new one; rotating the center bolt mounting the coil spring to threadedly engage the valve seat base through the valve seat and compress said coil spring; and replacing top of valve casing.